United States Patent [19]

Davenport

[11] Patent Number: 4,947,534
[45] Date of Patent: Aug. 14, 1990

[54] APPARATUS AND METHOD FOR SALVAGING CONCENTRIC PIPING MEMBERS

[76] Inventor: William C. Davenport, Power Performance, Inc., 3103 Hwy. 90 East, Broussard, La. 70518

[21] Appl. No.: 404,201

[22] Filed: Sep. 7, 1989

Related U.S. Application Data

[63] Continuation-in-part of Ser. No. 251,416, Sep. 30, 1988, abandoned.

[51] Int. Cl.$^5$ .............................................. B23P 19/02
[52] U.S. Cl. ................................. 29/426.4; 29/426.5; 29/234
[58] Field of Search .................... 29/426.4, 426.5, 234; 156/344, 584; 166/178, 177; 225/1; 125/40, 41

[56] References Cited

U.S. PATENT DOCUMENTS

| | | |
|---|---|---|
| 2,629,445 | 2/1953 | Dill . |
| 3,064,731 | 11/1962 | Hall . |
| 3,237,294 | 3/1966 | Brandeberry ................... 156/344 X |
| 3,727,599 | 4/1973 | Sugiki et al. ......................... 225/1 X |
| 3,866,425 | 2/1975 | Morrice ................................ 173/1 X |
| 4,026,602 | 5/1977 | Bieri ..................................... 299/23 X |
| 4,099,784 | 7/1978 | Cooper ................................ 299/23 X |
| 4,226,016 | 10/1980 | Carr ..................................... 29/426.4 |
| 4,327,703 | 4/1982 | Destree .......................... 29/426.4 X |
| 4,487,643 | 12/1984 | Ellett ............................... 156/344 X |

Primary Examiner—Timothy V. Eley
Attorney, Agent, or Firm—Wegner & Bretschneider

[57] ABSTRACT

A system for non-destructively salvaging cemented concentric piping members by ramming the concentric piping members, thereby breaking the bond between the piping members and the concrete. The ramming of the concrete portions is accomplished by anchoring the cemented concentric piping members to an immovable base, then separating an outer pipe or casing and inner concentric pipes from each other by using an air hammer.

16 Claims, 6 Drawing Sheets

APPARATUS AND METHOD FOR SALVAGING CONCENTRIC PIPING MEMBERS

CROSS-REFERENCE TO RELATED APPLICATION

This application is a continuation-in-part of co-pending application Ser. No. 251,416, filed Sept. 30, 1988 and now abandoned.

BACKGROUND OF THE INVENTION

This invention relates to the separation of concentrically disposed pipes which have been cemented together. More particularly, this invention relates to the non-destructive separation of such pipes.

In the oil industry, when an oil well is found to be "dry" or after depleting the oil reserves from the well, the drill strings along with their outer casings are extracted from the oil well, and in the standard practice of the industry, an attempt is made to salvage the innermost drill string. Using a known technology, the innermost drill string is salvaged by longitudinally cutting in two places over the entire length of the outer casing and any intermediate drill strings. The longitudinal cutting of the outer casing and intermediate drill strings is accomplished by oxygen-acetylene burning or high pressure water-blasting. In the known technology, as just described, the outer casing and intermediate drill strings are completely severed, thereby being able to salvage the innermost drill string by chipping away the cement portion attached thereto. The chipping away of the cement portion from the innermost drill string is often done manually which is a cumbersome and time-consuming process. Since the completely cut outer casing and any intermediate drill strings cannot be reused, they are often scrapped or melted. As often done, the outer casing and intermediate drill strings are scrapped which consequently litter the surrounding areas where the oil drilling is done.

This invention generally is concerned with a system for salvaging cemented concentric piping members. More particularly, by the use of this invention it is possible to separate the concentric piping members from the concrete portions in order to salvage all the piping portions thereof. This is accomplished by use of a ramming machine already known in the prior art for the purpose of installing pipes in the ground without the need for excavation.

The publication of Vibra King Inc. entitled "ACCU-RAM ® Powerful Ramming Machines" in its entirety teaches the air hammer device which may be employed in shattering or ramming the concrete portions of the cemented concentric piping members in this invention.

The ACCU-RAM ® ramming machine sold by Vibra King, Inc., as described in the aforementioned publication, is made for trenchless pipe-laying. Piping with nominal diameters up to 55 inches are inserted into the ground, without excavating, by the ramming machine which is powered by compressed air. The key to the use of the machine is impact. FIG. 3 shows the operation of the ramming machine for inserting a pipe in the ground. The pipes are actively driven forward under impact by the ramming machine which can be adapted to drive various pipe sizes using the taper locking ram cone or shoe which is illustrated in the publication and in FIG. 7.

Depending on pipe diameter, distance to be covered, soil conditions, and type of machine employed; propulsion speeds up to 30 feet per hour can be achieved. Air consumption is between 141 and 1272 cfm. The thrust power is the key factor in this kind of propulsion technology. The ramming machines develop thrusts of 80 to 1500 tons. Exact alignment can produce pushes dead on target.

SUMMARY OF THE INVENTION

With the foregoing background of this invention in mind, and as the following description of this invention proceeds, it will be appreciated that the primary object of the present invention is to provide a non-destructive system for separating the concentric members coupled together by concrete, and thus salvaging the separated concentric members for other uses.

It is another primary object of this invention to provide a salvaging system for cemented concentric piping members which uses a ramming air hammer for separating the concentric members from the concrete portions.

It is a further object of this invention to provide a system for salvaging cemented concentric piping members having an adaptor operably coupled to the ramming air hammer for fitting onto the cemented concentric piping members.

It is still another object of this invention to provide a system for salvaging cemented concentric piping members having an immovable base coupled to thereto.

The system for salvaging the cemented concentric piping members rams the cemented concentric piping members in order to salvage all the piping portions thereof. The ramming of the cemented portions is accomplished by anchoring the cemented concentric piping members to an immovable base, then separating an outer pipe or casing and inner concentric pipes from each other by using an air hammer. The cemented concentric piping members can, for example, be oil drill strings, oil drilling platform legs, or the like. The system for salvaging the concentric members of the present invention is efficient, economical, simply constructed and easily installed.

BRIEF DESCRIPTION OF THE DRAWINGS

The invention itself, as well as additional advantages and features, thereof, will be more readily and comprehensively understood from the following detailed description of the preferred embodiments, such description making reference to the appended sheets of drawings wherein:

FIG. 1 is a perspective view illustrating cemented concentric piping members for use as a drill string of an oil drill hole, or the like;

DETAILED DESCRIPTION OF THE PREFERRED EMBODIMENTS

Figure 1:
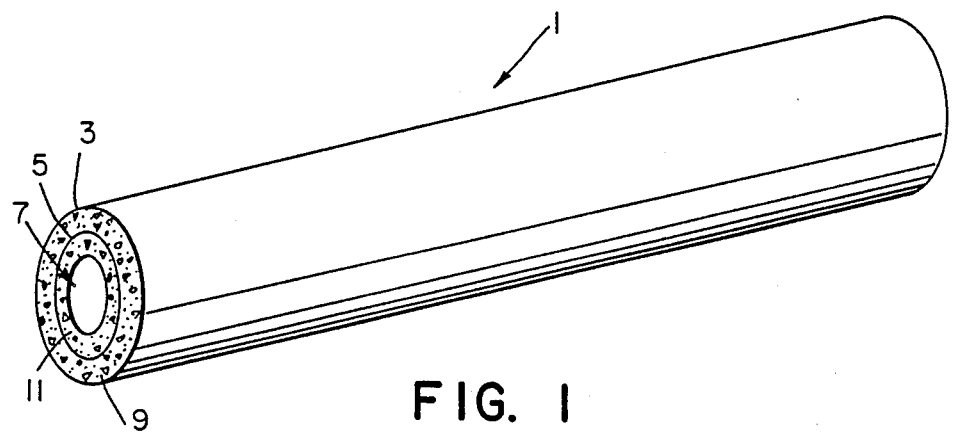

Attention is first directed to FIG. 1 which shows cemented concentric pipe members having an outer casing or pipe and embedded therein a plurality of inner pipes for use in oil drilling which are more particularly referred to as drill strings. The cemented concentric pipe members (hereinafter "cemented pipes") are generally referred to by reference number 1. The cemented pipes 1 include, for example, an outer casing 3, an intermediate drill string member or piping member 5, and an innermost drill string or piping member 7. Also included in the cemented pipes 1, are outer concrete portion 9 and inner concrete portion 11. The outer concrete portion 9 joins the intermediate piping member 7 and outer casing 3. The inner concrete portion 11 connects the intermediate 5 and inner 7 piping members.

As previously discussed, the cemented piping members, shown in FIG. 1 as a plurality of oil drill strings embedded within an outer casing, although not limited thereto, is used in the oil drilling industry by first driving the surface or outer casing 3 to a predetermined depth, and then anchoring or cementing it to the ground. The intermediate 5 and inner 7 drill strings are then drilled into and cemented onto each other and with the outer casing 3. If the oil well is found to be "dry" or after depleting the oil reserves from the well, the intermediate 5 and inner 7 drill strings along with the outer casing 3 are extracted from the oil well, and in the standard practice of the oil industry, an attempt is made to salvage the innermost drill string 7.

Figure 2A:
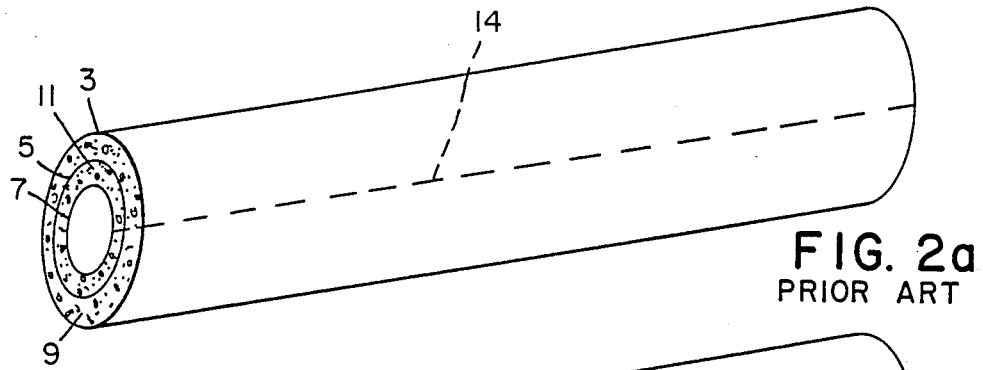
FIGS. 2a-2d are perspective views of the concentric piping members after having been disassembled or separated by the method of the prior art.
Figure 2B:
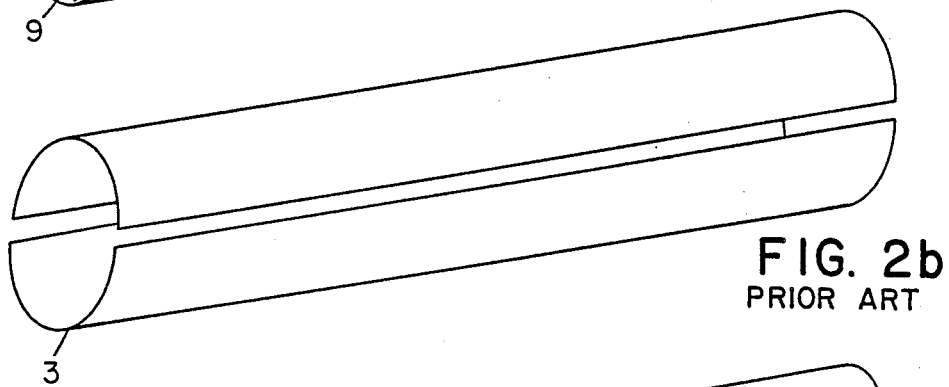
Figure 2C:
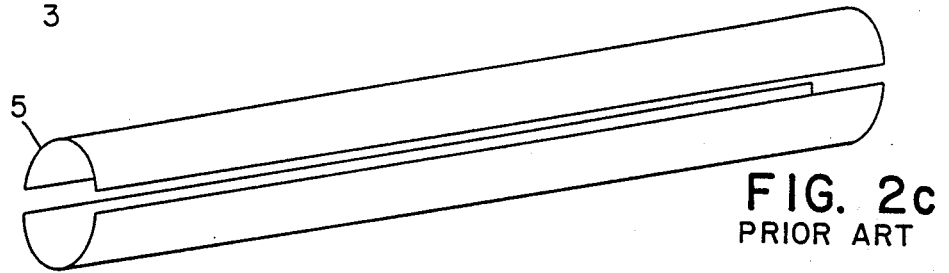
Figure 2D:
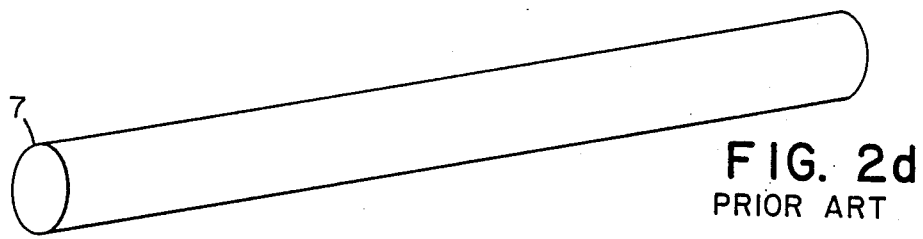

Using a known technology, the innermost drill string 7 is salvaged by longitudinally cutting in two places over the entire length of the cemented pipes 1 as shown in FIG. 2a. The longitudinal cutting of the cemented pipes is accomplished by oxygen-acetylene burning or high pressure water-blasting. In the known technology, as just described, the outer casing 3 and the intermediate drill string 5 are completely severed, thereby salvaging the innermost drill string 7 by chipping away the inner cement portion 11. The chipping away of the inner cement portion 11 from the inner drill string 7 is often done manually which is a cumbersome and time-consuming process. Since the cut out casing 3 and intermediate drill string 5 cannot be reused, they are often scrapped or melted. The scrapped outer casing 3 and intermediate drill string 5 when scrapped litter surrounding areas where oil drilling is done.

Figure 3:
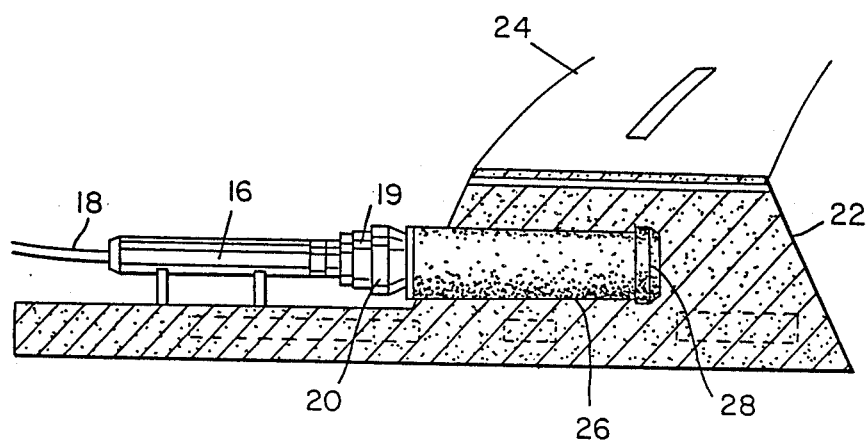
FIG. 3 is an elevational view of a ramming machine of the prior art showing the manner in which it is used for inserting a pipe in the ground.

Attention is now directed to FIG. 3 wherein there is shown a conventional ramming machine 16. The ramming machine 16 can be, for example, the type manufactured by Vibra King Inc. of Mankato, Minnesota. A detailed description of an "ACCU-RAM"-type ramming machine can be found in the aforementioned publication provided by Vibra King Inc., the contents of which are incorporated herein in its entirety by reference. As can be seen in FIG. 3, the ramming machine 16 generally includes a compressed air hose 18, a ram cone 19, an adaptor 20 for removing a drilled portion of the soil 22 beneath, for example, a street portion 24, an extension pipe 26 and a ramming shoe 28.

Figure 4:
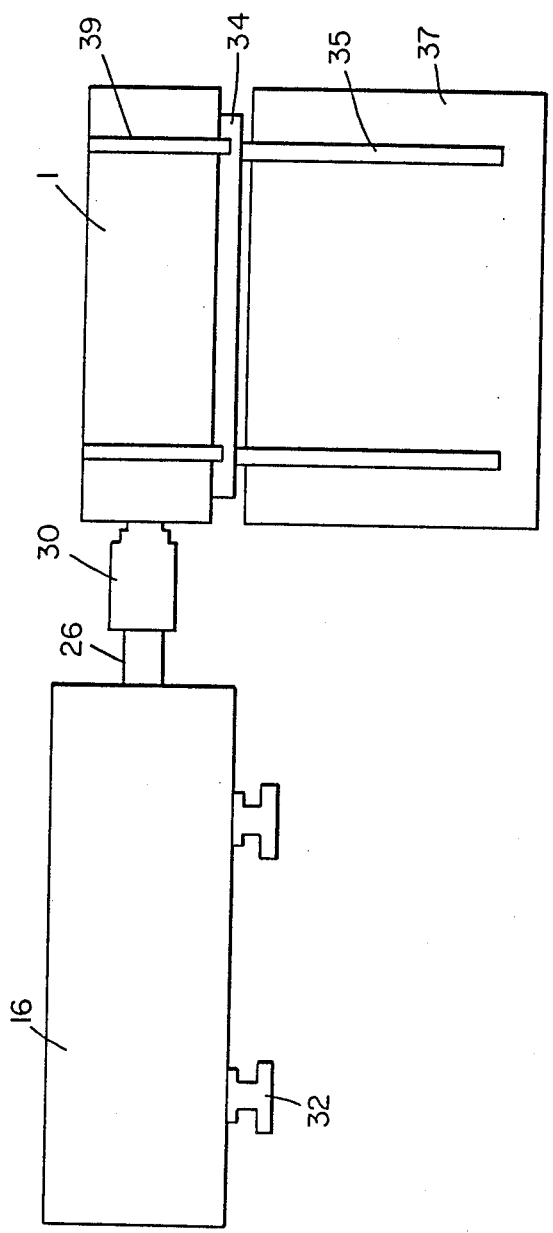
FIG. 4 is an elevational view schematically showing the system for salvaging cemented concentric piping members of the instant invention.

The system for salvaging the cemented pipes 1 according to the present invention comprises the structural elements schematically shown in FIG. 4. The ramming machine 16 has an optional extending pipe or adapter 26 which is operably coupled to a ramming shoe or cone 30 (see FIGS. 7a and 7b) specially fitted to abut an end of a cemented concentric pipe member to thereby ram the concentric pipe and cause the concrete portions 9, 11 (see, FIG. 1) to release the concentric pipe (see FIG. 8). As shown in FIG. 4, the ramming machine 16 may rest on base members 32 so that it can move longitudinally. As the ramming machine 16 hammers away at an inner concentric pipe, thereby pushing it outwardly, the machine "crawls" forward and into the outer concentric pipe (see FIG. 8). In order to effectively achieve the ramming of the intermediate 5 and inner 7 drill strings, with some consequent chipping of the concrete portions, the cemented pipes 1 are efficiently anchored on an immovable base member 34. The immovable base member 34 has a plurality of downwardly protruding members 35 which are embedded within a preferably concrete block 37. The concrete block 37 measures approximately 30 square yards and is preferably buried within the ground. The cemented pipes 1 are further supported by supporting members 39 which are preferably wrapped around the cemented pipes 1. The supporting members 39 are preferably anchored onto the immovable base member 34.

Figure 7A:
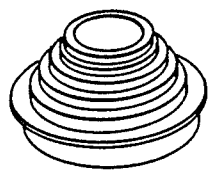
FIG. 7a is a perspective view of a stepped ramming shoe used in the instant invention.
Figure 7B:
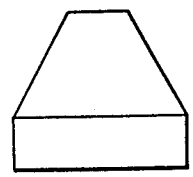
FIG. 7b is an elevational view of a tapered ramming shoe used in the instant invention.
Figure 8:
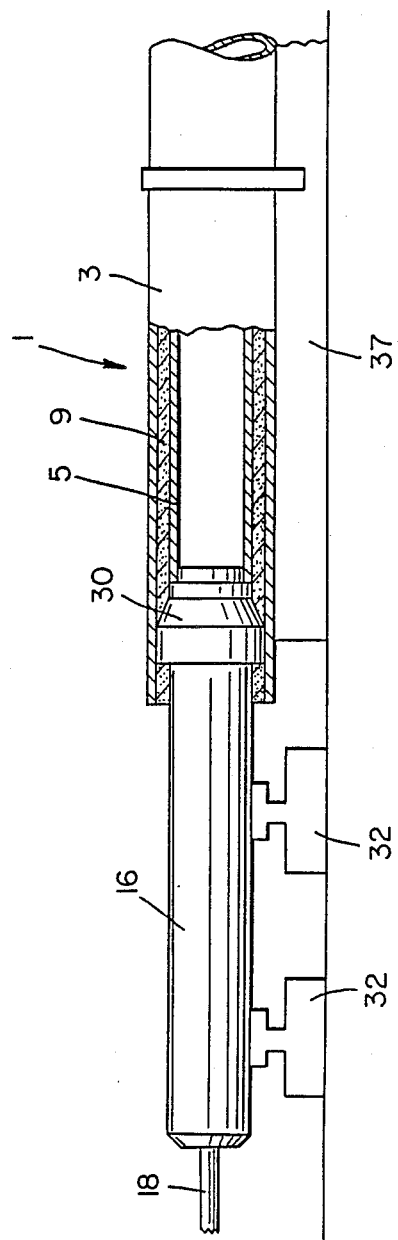
FIG. 8 is an elevational view, partly in cross-section for illustrative clarity, showing the system of the instant invention salvaging a concentric pipe member.

The ramming shoe or cone 30 may be stepped as shown in FiG. 7a or tapered as shown in FIG. 7b. Thus, it can be used with a variety of different size pipes. Alternatively, different size ramming shoes may be used and changed depending on the pipe diameter.

Figure 5:
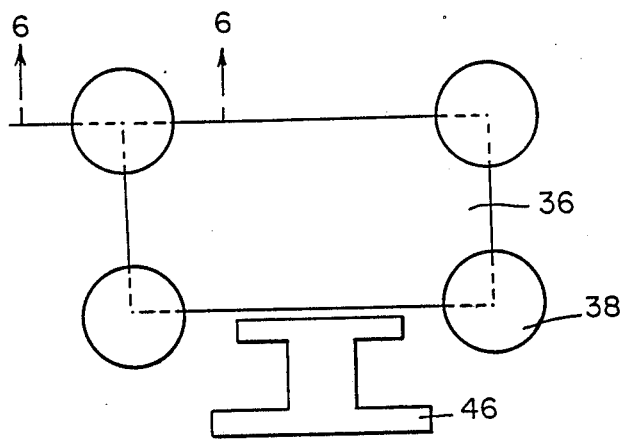
FIG. 5 is a partial end view schematically showing the base portion of an oil drilling platform generally having four legs set on a base for separation of concentric members according to the instant invention.
Figure 6:
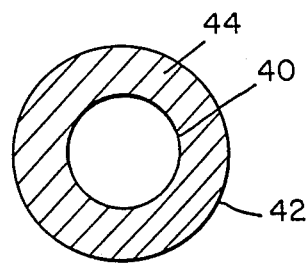
FIG. 6 is a cross-sectional view taken along line 6—6 of FIG. 5 showing the different portions of a leg of the oil drilling platform.

In another embodiment wherein the system of the instant invention is effectively used is shown in FIG. 5 which schematically illustrates the base portion of an oil drilling platform 36 having leg portions 38, each having inner 40 and outer 42 concentric pipes connected together by a concrete portion 44 as shown in FIG. 6. The oil drilling platform 36 is anchored or mounted on an immovable base 46 for allowing the ramming machine 16 with the ramming shoe which is well fitted to an inner pipe of the leg 38 to separate the inner pipe from an outer pipe.

As clearly described, the system for salvaging cemented concentric piping members can be utilized for salvaging the pipes encompassing an oil well drill strings, an oil drill platform, or the like. Thus, while the invention has been particularly shown and described with reference to preferred embodiments thereof, it will be understood by those skilled in the art that changes in form and details may be made therein without departing from the spirit and scope of the invention.

I claim:

1. A method of salvaging cemented concentric piping members having an outer casing and at least one inner piping member essentially concentrically disposed therein and joined together by at least one essentially concentric concrete portion, comprising the steps of:
   (A) supporting said cemented concentric piping members on a base means;
   (B) providing a ramming means;
   (C) operably coupling a ramming shoe means on said ramming means;

(D) aligning said ramming shoe means with, and abutting, an end of said cemented concentric piping members (E) ramming said cemented concentric piping members with said ramming means;

(F) conducting steps (D) and (E) as many times as there are inner piping members; and thereafter (G) salvaging said at least one inner piping member and said outer casing.

2. The method of salvaging cemented concentric piping members as in claim 1, further comprising the step of supporting said ramming means in a substantially horizontal position.

3. The method of salvaging cemented concentric piping members as in claim 1, further comprising the step of supporting said cemented concentric piping members on said base means in a substantially horizontal position.

4. The method of salvaging cemented concentric piping members as in claim 1, wherein said step of supporting said cemented concentric piping members comprises the step of supporting at least one oil drill string in a substantially horizontal position.

5. The method of salvaging cemented concentric piping members as in claim 4, wherein said oil drill string is supported in an immovable fashion.

6. The method of salvaging cemented concentric piping members as in claim 1, wherein said step of supporting said cemented concentric piping members comprises the step of supporting at least a part of an oil drilling platform such that the legs thereof are in a substantially horizontal position.

7. The method of salvaging cemented concentric piping members as in claim 6, wherein said oil drilling platform is supported in an immovable fashion.

8. The method for salvaging cemented concentric piping members as in claim 1, wherein said base means has connected thereto downwardly protruding members embedded within a concrete block.

9. An apparatus for salvaging cemented concentric piping members having an outer casing and at least one inner piping member essentially concentrically disposed therein and joined together by at least one essentially concentric concrete portion, comprising:

(A) a ramming shoe means adapted to abut an end of said cemented concentric piping members for separating said at least one inner piping member from said at least one concrete portion;

(B) a ramming means for providing the required working force to said ramming shoe means; and (C) at least one immovable base means for securely supporting said cemented piping members.

10. The apparatus for salvaging concentric cemented piping members as in claim 9, further comprising means for at least initially supporting said ramming means in alignment with said cemented piping members.

11. The apparatus for salvaging concentric cemented piping members as in claim 10, wherein said ramming means is supported on said supporting means in a substantially horizontal position.

12. The apparatus for salvaging cemented concentric piping members as in claim 11, wherein said cemented concentric piping members is supported on said base means in a substantially horizontal position.

13. The apparatus for salvaging cemented concentric piping members as in claim 9, wherein said cemented concentric piping members is supported on said base means in a substantially horizontal position.

14. The apparatus for salvaging cemented concentric piping members as in claim 9, wherein said cemented concentric piping members is an oil drill string.

15. The apparatus for salvaging cemented concentric piping members as in claim 9, wherein said cemented concentric piping members is a leg of an oil drilling platform.

16. An apparatus for salvaging cemented concentric piping members having an outer casing and at least one inner piping member essentially concentrically disposed therein and joined together by at least one essentially concentric concrete portion, comprising:

(A) a ramming shoe means abutting an end of said cemented concentric piping members for separating said at least one inner piping member from said at least one concrete portion;

(B) a ramming means for providing the required working force to said ramming shoe means; and (C) at least one base means for securely supporting said cemented piping members, said at least one base means comprising at least one downwardly protruding member embedded within a concrete block.

* * * * *